Figure 1:
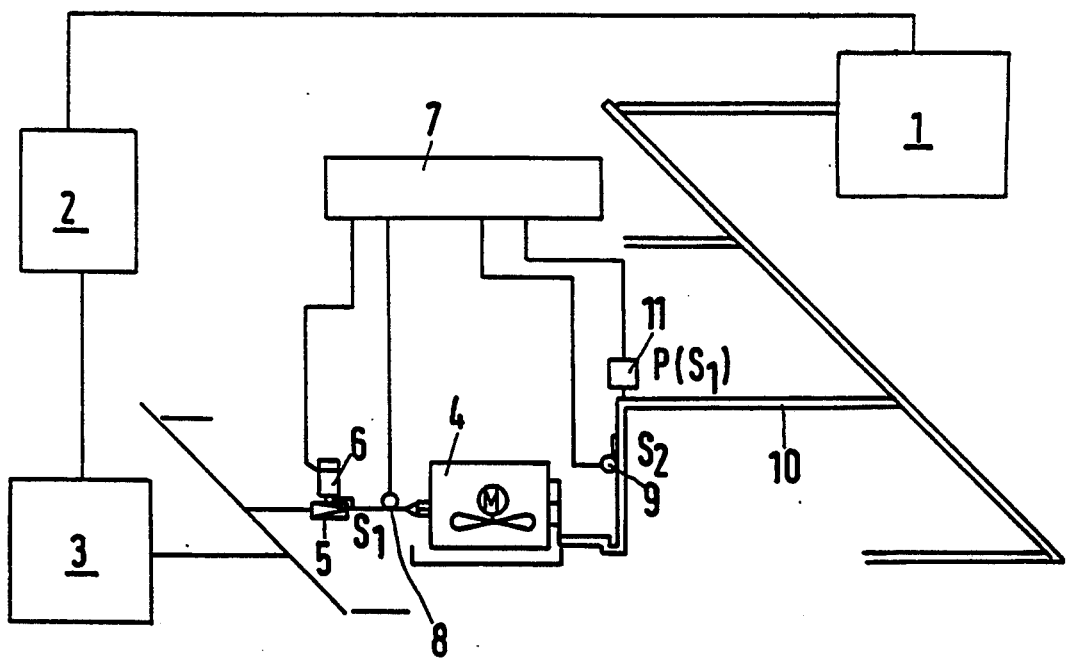

United States Patent [19]
Bendtsen

[11] Patent Number: 5,396,780
[45] Date of Patent: Mar. 14, 1995

[54] REFRIGERATION SYSTEM AND METHOD OF CONTROLLING A REFRIGERATION SYSTEM

[75] Inventor: Christian Bendtsen, Sydals, Denmark
[73] Assignee: Danfoss A/S, Nordborg, Denmark
[21] Appl. No.: 153,881
[22] Filed: Nov. 17, 1993
[30] Foreign Application Priority Data
  Dec. 18, 1992 [DE] Germany .................. 42 42 848.3
[51] Int. Cl.$^6$ ............................................ F25B 41/00
[52] U.S. Cl. ........................................ 62/212; 62/225; 236/75
[58] Field of Search .............. 62/225, 212; 236/78 D, 236/78 C, 75

[56] References Cited

U.S. PATENT DOCUMENTS 4,617,804 10/1986 Fukushima et al. ............... 62/212
4,787,213 11/1988 Gras et al. ......................... 236/75 X

FOREIGN PATENT DOCUMENTS 0118035 5/1989 Japan ............................. 236/78 D
0017358 1/1990 Japan ............................. 62/225

Primary Examiner—William E. Wayner
Attorney, Agent, or Firm—Wayne B. Easton

[57] ABSTRACT

A refrigeration system having a compressor, a condenser and an evaporator between the condenser and the compressor. A controllable valve unit at the input side of the evaporator has degrees of opening for controlling fluid flow through said evaporator. A control unit controls the degrees of opening of the valve unit. Sensors connected to the control unit and opposite ends of the evaporator detect superheat temperatures between the input and output sides of the evaporator. The control unit is operable to control the degrees of valve opening in accordance with the superheat temperatures (1) at a first greater desired opening and closing displacement rate between desired predetermined minimum and maximum values of a first range of superheat temperature values and (2) at a second opening and closing rate lesser than the first displacement rate for a second range of superheat temperature values lower than the first range of values. The second range of superheat temperature values lie within the region of 10% or less of the first range of superheat temperature values.

3 Claims, 1 Drawing Sheet

REFRIGERATION SYSTEM AND METHOD OF CONTROLLING A REFRIGERATION SYSTEM

The invention relates to a refrigeration system with a compressor arrangement and a condenser arrangement, between which there is arranged at least one evaporator which at its input side has a controllable injection valve, and with a control device which is connected to pressure and/or temperature sensors at the input side and output side of the evaporator and which actuates the injection valve to control the superheat temperature. The invention also relates to a method of controlling a refrigeration system, in which the desired value of the superheat temperature of an evaporator is modified in dependence on the degree of opening of an injection valve which is arranged between the condenser and the intake side of the compressor.

Such refrigeration systems and corresponding control methods are generally known, see, for example, (U.S. Pat. No. 4,845,956), DE 37 13 869 A1 or DE 41 00 749 A1. In these cases, the compressor arrangement may comprise several compressors. The condenser arrangement may comprise several condensers. Normally, the compressor arrangement, the condenser arrangement and the evaporator are combined in one circuit.

It is desirable for the boundary between the liquid phase and the gaseous phase of the refrigerant to be kept within the evaporator. For that purpose, the injection or expansion valves are controlled so that the amount of refrigerant that is able to enter the evaporator corresponds only to the amount that can be evaporated in the evaporator. Because of fluctuations in the load or in the intake pressure or condenser pressure, however, it is inevitable that occasionally "running-through" occurs, that it to say, the injection valve opens too wide, so that liquid refrigerant appears at the outlet of the evaporator. In particular in the case of short superheat zones, the boundary between the normal filling level of the evaporator and running-through is relatively narrow.

If such running-through occurs, the superheat drops to 0 K, that is to say, the temperature difference between the input and the output of the evaporator, or the temperature corresponding to the pressure at the output, is 0. The injection valve closes. The evaporator can be emptied by suction very quickly. But then there is no flow of refrigerant available to restore a temperature difference between output and input of the evaporator, and thus to generate a superheat signal to open the injection valve. The evaporator cannot be activated. The valve does not open again until the output of the evaporator has been heated sufficiently by the ambient temperature for a minimum superheat to be set across the evaporator. This heating-up process can take a relatively long time however, in particular with well-insulated intake lines.

The problem is especially apparent when the signals supplied to the control device are pure temperature signals. Also when using pressure signals on the output side of the evaporator, the problem can occur in relatively large centralized systems having several evaporators connected to the same intake line, when the individual evaporator has only a negligible influence on the common intake pressure. When running-through occurs in an evaporator, the intake pressure also does not drop sufficiently, when the valve closes, for a value to be achieved which would normally open the valve, if the pressure were to be used at the evaporator output as control signal or the valve were pressure-controlled. It goes without saying that a relatively long closure of the injection valve and the consequent deactivation of the associated evaporator is undesirable, because the refrigeration efficiency of the particular evaporator drops dramatically as a result.

The invention is therefore based on the problem of improving the operational behaviour of a refrigeration system.

In a refrigeration system of the kind mentioned in the introduction this problem is solved in that the control device modifies the correlation between the superheat temperature and the degree of opening of the injection valve when the injection valve falls below a predetermined degree of opening.

Either the valve can be prevented from closing completely or, after closing, a more rapid re-opening is effected. Provided that the valve does not close entirely, a flow of refrigerant is maintained which within a very short time leads to a normal superheat of the evaporator again, and therefore to the activation thereof.

Preferably, the control device lowers the value of the superheat temperature at which the injection valve opens to a predetermined minimum value. Although the injection valve is allowed to close completely in that case, this can in fact be desirable, in particular after the occurrence of running-through. At any rate, the temperature at the output of the evaporator then needs to be raised only a relatively small amount, namely, to the predetermined minimum value. The injection valve then opens, even if only slightly, and allows refrigerant to flow into the evaporator. This then results in heating of the evaporator output, and thus in setting of a superheat temperature, which again allows normal operation of the evaporator.

Advantageously, the predetermined degree of opening lies within the region of 10% or less of the maximum degree of opening. With this small degree of opening it is relatively uncritical that the superheat temperature is changed. For normal operation, the correlation between superheat temperature and degree of opening of the injection valve is consequently maintained. Additional measures are taken only when errors are to be eliminated.

Preferably, the correlation between the degree of opening and the superheat below the predetermined degree of opening can be represented by a curve which intersects a limit for the smallest stable superheat. A relatively small minimum value for the superheat temperature can therefore be selected without the predetermined degree of opening having to be lowered too far. By exceeding the limit for the smallest stable superheat, instabilities in control may possibly occur, but these are not critical since there is no appreciable control in this region. On the contrary, opening the injection valve leads very quickly to a superheat temperature across the evaporator, which facilitates normal control response. The superheat temperature in fact rises relatively quickly once the valve has opened.

It is especially preferred for the curve to be a straight line. Control in this region, should it prove necessary, can then be effected as a normal proportional control.

In a method of the kind mentioned in the introduction, the problem is solved in that the correlation between the superheat and the degree of opening is modified when the degree of opening falls below a predetermined value.

As stated above, this means that the injection valve either does not close completely, or opens far earlier than previously. After only a short time, a flow of refrigerant can therefore be achieved again which leads to the required superheating of the evaporator.

In this connection, it is especially preferred for the desired value of the superheat temperature at which the injection valve starts to open to be lowered to a predetermined minimum value. This admittedly allows the expansion valve to close completely, but after running-through has occurred in the evaporator, that is, the evaporator has been filled completely with liquid refrigerant, this is desirable because as a consequence the evaporator can be emptied relatively quickly and sufficiently thoroughly so that a short time later refrigerant flowing in is able to lead to superheating again.

Advantageously, the lowering is effected by an amount which is of the order of magnitude of the difference between the maximum value of the superheating and the value at which the injection valve reaches its predetermined degree of opening. The previous temperature range within which the injection valve is changed between a fully closed and a fully opened state is consequently virtually doubled. Since the doubling of this range comprises an exclusively downward expansion, this ensures that the injection valve is able to open again a relatively short time after the complete closure.

The minimum value preferably lies in the range from 1 to 2 K. An increase in temperature at the evaporator output by this value can be achieved in a relatively short time, even with good insulation, by means of the ambient temperature.

Figure 2:
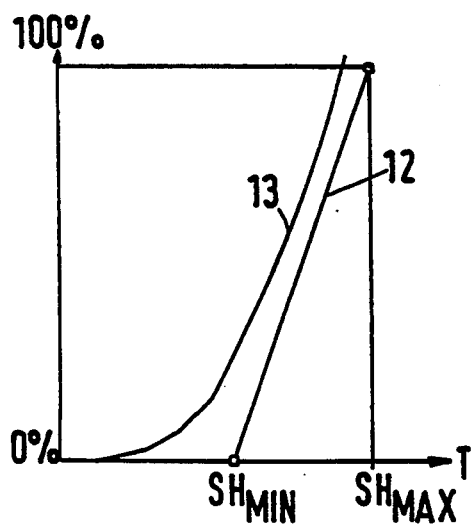
Figure 3:
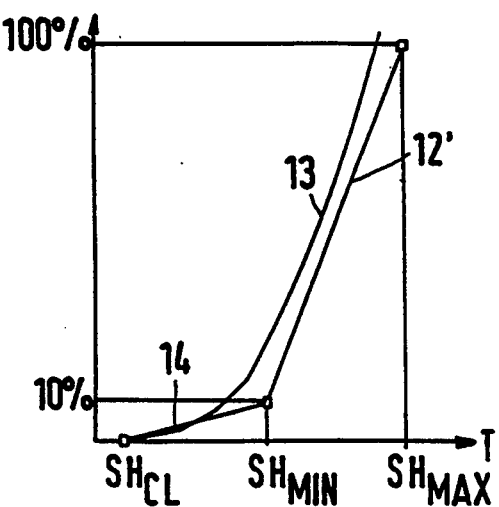

The invention is described hereinafter with reference to a preferred embodiment in conjunction with the drawing, in which FIG. 1 is a diagrammatic fragmentary view of a refrigeration system, FIG. 2 shows the functional correlation between the superheat of an evaporator and the degree of opening of an expansion valve, and FIG. 3 shows the correlation from FIG. 2 with modifications.

A refrigeration system comprises a compressor device 1, a condenser device 2, a collecting container 3 and an evaporator 4 which are connected together in that order in circuit. The compressor device 1 can herein comprise several individual compressors. The condenser device 2 can comprise several individual condensers. Further evaporators can be provided parallel to the illustrated evaporator 4, as indicated by the stub-like lines.

The evaporator 4 has at its input an expansion or injection valve 5, the degree of opening of which can be varied by an actuator 6. The actuator 6 is activated by a control device 7. The control device 7 receives input data from a first temperature sensor 8 at the input of the evaporator 4, a second temperature sensor 9 at the output of the evaporator 4 in an intake line 10 between the evaporator 4 and the compressor device 1, or from the temperature sensor 9 and from a pressure sensor 11 on the intake line 10. The first temperature sensor 8 and the pressure sensor 11 can be provided as alternatives to one another.

By means of the actuator 6, the control device 7 sets the degree of opening of the expansion valve 5 so that a desired superheat, that is a temperature difference, is produced between the input and the output of the evaporator 4. This superheat can be adapted in a manner not explained more precisely to demands of the refrigeration system. For that purpose, further input lines, not explained more precisely, for the control device 7 can optionally be provided.

FIG. 2 shows a typical correlation between the superheat of the evaporator (plotted towards the right) and the degree of opening or displacement of the expansion valve 5 (plotted upwardly). This correlation, which relates the degree of opening or displacement of valve 5 with the superheat temperature, follows a straight line 12 between the minimum degree of opening of 0% and the maximum degree of opening of 100%. It is thus the degree of slope of the line 12 that indicates the opening or closing displacement rate of the valve 5 relative to the superheat temperature. In FIG. 3 the slope of line segment 12' indicates a greater opening and closing displacement rate than does the slope of the line segment 14. The straight line 12 corresponds to the proportional band of control of the evaporator. The straight line 12 lies close to a stability limit 13 which is determined by the smallest stable superheat. The stability limit curve 13 indicates the desired operating condition referred to above wherein the boundary between the liquid and gaseous phases of the refrigerant is kept within the evaporator. The magnitudes of the slopes of the operating curves 12' and 14 determine the position of the boundary in the evaporator in that a higher slope results in a larger valve opening which moves the boundary towards the outlet end of the evaporator and vice versa relative to the inlet end of the evaporator.

The slopes of the curves 12' and 14 are controlled by the control unit 7 and thus control unit 7 is set so that the curves 12' and 14 are close to the stability limit curve 13 but spaced somewhat to the right to provide a margin of stability.

If the expansion valve 5 starts to open, that is, the degree of opening enlarges from 0%, a minimum desired superheat temperature value $SH_{min}$ is set. The largest desired superheat temperature value $SH_{max}$ is set at a maximum opening degree of 100%. It is clear that a certain minimum superheat is necessary for the expansion valve 5 to start to open at all. The correlation represented by the straight line 12 between the opening characteristic of the expansion valve 5 and the superheat temperature is selected so that the boundary between the liquid and the gaseous phase lies in the evaporator 4. The evaporator 4 therefore normally always has a region which is filled with gaseous refrigerant. The temperature difference in the evaporator 4 is produced chiefly over this gaseous phase.

When the loading fluctuates markedly or upon sudden changes in the intake pressure or in the condenser pressure, it may be, however, that too much refrigerant flows into the evaporator 4, so that it is no longer able to evaporate there and fills up the evaporator 4 completely. During this "running-through", there is liquid refrigerant not only at the input of the evaporator but also at its output. The liquid refrigerant has everywhere substantially the same temperature, so that the temperature difference between input and output, that is to say, the difference between the temperatures $S_2$ and $S_1$, assumes the value 0. The expansion valve 5 is closed. The evaporator 4 is emptied by the compressor device 1. Since no refrigerant is able to flow in because the expansion valve 5 is closed, there can also be no temperature difference between the input and the output of the evaporator 4. The expansion valve 5 therefore does not open until the temperature sensor 9 at the evaporator output has been heated by the ambient temperature to a temperature that corresponds to the set minimum superheat temperature $SH_{min}$. This can take a relatively long time, however, if the intake line 10 is well insulated.

FIG. 3 shows that the original correlation 12 between the degree of opening of the expansion valve 5 and the superheat has been modified. This correlation obeys the function 12' for the largest part of the degree of opening of the expansion valve 5, but if the degree of opening of the expansion valve 5 falls below a minimum value, in this particular case 10% for example, the correlation between the opening characteristic and the superheat is modified. The function can now be represented by two straight lines 12', 14 of which one, 12', has already been discussed It starts at a point which is defined by the degree of opening of 10% and the minimum superheat temperature $SH_{min}$, and ends at a point which is defined by the degree of opening of 100% and the maximum superheat temperature $SH_{max}$. The other straight line 14 ends at the start of this straight line 12' and starts at a point which is defined by the degree of opening of 0% and a lower superheat temperature $SH_{Cl}$. This straight line 14 crosses the stability boundary 13, but this is not critical, as will become apparent from the following explanation.

The superheat $SH_{Cl}$ lies at about 1 to 2 K.

If the expansion valve 5 now closes, only a relatively small temperature rise at the output of the evaporator 4 is necessary to cause the expansion valve 5 to open again. As soon as the expansion valve 5 opens, a small flow of refrigerant occurs which leads relatively quickly to a superheat temperature between $SH_{min}$ and $SH_{max}$, that is, in a range in which normal proportional control corresponding to the straight line 12' is possible. The minor instabilities that can occur in the region of the straight line 14 have only a slight distorting effect on the correlation between the opening characteristic and the superheating. This is unimportant, however, since this region is passed through relatively quickly. In this manner, even after running-through has occurred in the evaporator, a stable state can be reached again relatively quickly in that the evaporator 4 is filled with refrigerant to an optimum extent, corresponding to the refrigeration requirement.

I claim:

1. A refrigeration system comprising,
   a refrigerant flow circuit,
   a compressor and a condenser in said flow circuit,
   an evaporator in said flow circuit on the downstream side of said condenser between said condenser and said compressor,
   controllable valve means at the input side of said evaporator having degrees of opening for controlling fluid flow through said evaporator,
   control means for controlling the degree of opening of said valve means,
   sensor means being connected to said control means and being connected at the input and output sides of said evaporator for detecting superheat temperatures between said input and output sides,
   said control means being operable to control said degrees of valve opening in accordance with said superheat temperatures (1) at a first greater desired opening and closing displacement rate between desired predetermined minimum and maximum values of a first range of superheat temperature values and (2) at a second opening and closing rate lesser than said first displacement rate for a second range of superheat temperature values lower than said first range of values.

2. A refrigeration system according to claim 1, characterized in that said control means opens said valve means at a predetermined minimum value of said superheat temperature.

3. A refrigeration system according to claim 1, characterized in that said second range of superheat temperature values lie within the region of 10% less of said first range of superheat temperature values.

* * * * *